United States Patent
Chen

(10) Patent No.: US 7,346,210 B2
(45) Date of Patent: Mar. 18, 2008

(54) IMAGE PROCESSING DEVICE AND IMAGE PROCESSING PROGRAM FOR DETERMINING SIMILARITY FACTORS OF PIXELS

(75) Inventor: Zhe-Hong Chen, Fort Collins, CO (US)

(73) Assignee: Nikon Corporation, Tokyo (JP)

( * ) Notice: Subject to any disclaimer, the term of this patent is extended or adjusted under 35 U.S.C. 154(b) by 693 days.

(21) Appl. No.: 10/499,969

(22) PCT Filed: Dec. 27, 2002

(86) PCT No.: PCT/JP02/13801

§ 371 (c)(1),
(2), (4) Date: Jun. 24, 2004

(87) PCT Pub. No.: WO03/058554

PCT Pub. Date: Jul. 17, 2003

(65) Prior Publication Data

US 2005/0069218 A1    Mar. 31, 2005

(30) Foreign Application Priority Data

Dec. 28, 2001  (JP)  ............... 2001-400745

(51) Int. Cl.
*G06K 9/00* (2006.01)
*G06K 9/68* (2006.01)
*G06K 9/36* (2006.01)

(52) U.S. Cl. .................... 382/162; 382/218

(58) Field of Classification Search ............ 382/162, 382/164, 165, 167, 218, 219, 272, 274; 345/600–604; 358/515, 518; 348/222.1
See application file for complete search history.

(56) References Cited

U.S. PATENT DOCUMENTS

| | | | | |
|---|---|---|---|---|
| 5,067,162 A | * | 11/1991 | Driscoll et al. | 382/126 |
| 2001/0005429 A1 | * | 6/2001 | Ishiga et al. | 382/167 |
| 2003/0113000 A1 | * | 6/2003 | Hyoki et al. | 382/112 |
| 2003/0164886 A1 | * | 9/2003 | Chen | 348/272 |
| 2005/0069218 A1 | * | 3/2005 | Chen | 382/274 |
| 2005/0220339 A1 | * | 10/2005 | Kim | 382/165 |
| 2006/0115148 A1 | * | 6/2006 | Ouchi | 382/165 |

FOREIGN PATENT DOCUMENTS

JP  A 8-205181    8/1996
JP  A 2001-275126  10/2001

* cited by examiner

*Primary Examiner*—Amir Alavi
(74) *Attorney, Agent, or Firm*—Oliff & Berridge, PLC

(57) ABSTRACT

An image processing device according to the present invention includes a similarity factor calculating portion locally comparing pixels that compose an image so as to calculate a similarity factor of the pixels in a predetermined direction, and includes an analyzing portion analyzing the structure of the image in accordance with the similarity factor calculated by the similarity factor calculating portion. In particular, the similarity factor calculating portion selects and changes pixels to be compared in accordance with color shift of the image to calculate the similarity factor. As a result, a similarity factor can be calculated with suppressing influence of color shift.

16 Claims, 10 Drawing Sheets

Fig. 2

| COORDINATES [X, Y] | i-4 | i-3 | i-2 | i-1 | i | i+1 | i+2 | i+3 | i+4 |
|---|---|---|---|---|---|---|---|---|---|
| j-4 | R | G | R | G | R | G | R | G | R |
| j-3 | G | B | G | B | G | B | G | B | G |
| j-2 | R | G | R | G | R | G | R | G | R |
| j-1 | G | B | G | B | G | B | G | B | G |
| j   | R | G | R | G | R | G | R | G | R |
| j+1 | G | B | G | B | G | B | G | B | G |
| j+2 | R | G | R | G | R | G | R | G | R |
| j+3 | G | B | G | B | G | B | G | B | G |
| j+4 | R | G | R | G | R | G | R | G | R |

Fig. 5

| BLOCK 10 | BLOCK 16 | BLOCK 20 | BLOCK 24 | BLOCK 28 | BLOCK 35 |
|---|---|---|---|---|---|
| BLOCK 11 | BLOCK 15 | BLOCK 19 | BLOCK 23 | BLOCK 27 | BLOCK 34 |
| BLOCK 12 | BLOCK 14 | BLOCK 4 | BLOCK 6 | BLOCK 9 | BLOCK 33 |
| BLOCK 17 | BLOCK 13 | BLOCK 3 | BLOCK 1 | BLOCK 8 | BLOCK 32 |
| BLOCK 18 | BLOCK 11 | BLOCK 2 | BLOCK 5 | BLOCK 7 | BLOCK 31 |
| BLOCK 21 | BLOCK 18 | BLOCK 22 | BLOCK 26 | BLOCK 30 | |
| BLOCK 25 | BLOCK 17 | BLOCK 21 | BLOCK 25 | BLOCK 29 | |

Fig. 6

| COORDINATES [X, Y] | i-4 | i-3 | i-2 | i-1 | i | i+1 | i+2 | i+3 | i+4 |
|---|---|---|---|---|---|---|---|---|---|
| j-4 | R | G | R | G | R | G | R | G | R |
| j-3 | G | B | G | B | G | B | G | B | G |
| j-2 | R | G | R | G | R | G | R | G | R |
| j-1 | G | B | G | B | G | B | G | B | G |
| j   | R | G | R | G | R | G | R | G | R |
| j+1 | G | B | G | B | G | B | G | B | G |
| j+2 | R | G | R | G | R | G | R | G | R |
| j+3 | G | B | G | B | G | B | G | B | G |
| j+4 | R | G | R | G | R | G | R | G | R |

LOCAL REGION 1 (upper right), LOCAL REGION 2 (lower left)

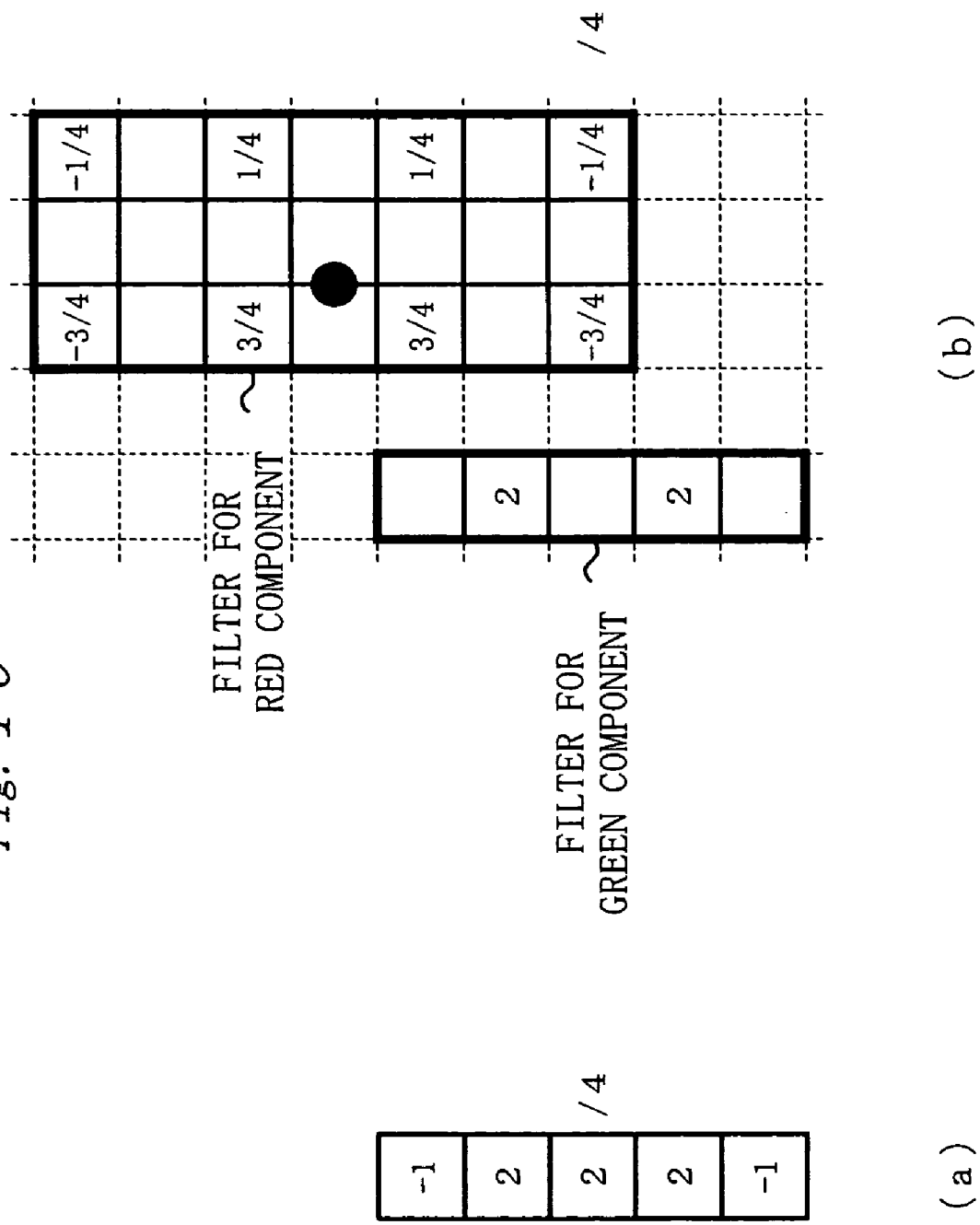

IMAGE PROCESSING DEVICE AND IMAGE PROCESSING PROGRAM FOR DETERMINING SIMILARITY FACTORS OF PIXELS

This Application is a 371 of PCT/JP02/13801 filed Dec. 27, 2002.

BACKGROUND OF THE INVENTION

1. Field of the Invention

The present invention relates to an image processing device for performing an image process and to an image processing program for causing a computer to perform an image process.

2. Description of the Related Art

Nowadays, an image processing device that performs the following image processes for image data photographed by an image sensor, a film scanner, or the like has been disclosed.

(1) a process for transforming input image data into new image data (for example, an interpolating process, a color interpolating process, a color coordinate transforming process, an edge emphasizing process, a resolution transforming process, a spatial frequency filtering process, and so forth).

(2) an image analyzing process for analyzing an image structure of image data (for example, a process for determining local similarity in image data and analyzing local image structure in accordance with the determined result).

In particular, the foregoing image analyzing process is an important technology for performing an advanced interpolating process.

On the other hand, in an optical system of an electronic camera, a phenomenon is known that slight color shift takes place in image data due to chromatic aberration of magnification. In recent years, since photographic resolutions of electronic cameras have become higher, even slight color shift tends to be unignorable.

It is known that when a film that has chromatic aberration of magnification is read by a film scanner, there occurs a phenomenon that slight color shift takes place in image data.

As countermeasures against such color shift due to chromatic aberration of magnification, a correction technology for enlarging or reducing an image plane of each color component has been disclosed (hereinafter referred to as "correction of color shifted image").

SUMMARY OF THE INVENTION

The foregoing image analyzing process has high possibility that color information of desired positions cannot be compared due to influence of color shift. Thus, there occurs a risk that the determination of similarity has an error.

Such a determination error of similarity might disturb an advanced interpolating process. Particularly, in a color interpolating process of a 1-CCD type electronic camera, a determination error of similarity would result in false colors.

To solve such a problem, after the foregoing color shifted image is corrected, an advanced color interpolating process may be performed in consideration of similarity. However, since such a method requires two interpolating processes, image quality will be largely deteriorated. In addition, the two interpolating processes require a large buffer memory space for the image, and the calculating process will take a long time.

To solve the foregoing problems, an object of the present invention is to properly determine similarity factors of color shifted image data.

Moreover, another object of the present invention is to properly perform an image processing on color shifted image data.

Next, the present invention will be described.

An image processing device according to the present invention includes a similarity factor calculating portion locally comparing pixels that compose an image so as to calculate a similarity factor of the pixels in a predetermined direction, and an analyzing portion analyzing structure of the image in accordance with the similarity factor calculated by the similarity factor calculating portion. In particular, the similarity factor calculating portion calculates the similarity factor of the pixels in accordance with positions of the pixels in the image.

Preferably, in the similarity factor calculating portion, the similarity factor includes a value determined by performing a weighted addition of "a similarity factor element in same colors obtained by comparing pixels of same colors" and "a similarity factor element in different colors obtained by comparing pixels of different colors". In this case, the similarity factor calculating portion preferably changes a weighting coefficient for the weighted addition in accordance with the positions of the pixels whose similarity factor is to be calculated.

Still preferably, the similarity factor calculating portion changes the weighting coefficient in accordance with distance from "the center of the image" to "the pixels whose similarity factor is to be calculated".

In addition, the similarity factor calculating portion preferably changes the weighting coefficient so that weight of the similarity factor element in different colors is smaller at a peripheral part of the image than at a center part of the image.

In addition, the similarity factor calculating portion preferably divides the image into a plurality of regions and changes the weighting coefficient for each of the divided regions.

In addition, the similarity factor calculating portion preferably changes the weighting coefficient in accordance with a characteristic of color shift of an optical system for generating the image.

In addition, the similarity factor calculating portion preferably calculates a similarity factor including a weighted addition value of "a similarity factor element in same colors obtained by comparing pixels of same colors" and "a similarity factor element in different colors obtained by comparing pixels of different colors" in a region containing the center of the image (referred to as center region).

In addition, the similarity factor calculating portion preferably calculates a similarity factor that does not contain the similarity factor element in different colors, but contains the similarity factor element in same colors in a region other than the center region.

In addition, the similarity factor calculating portion preferably changes relative location of "a considered pixel whose similarity factor is to be calculated" and "a reference pixel that is referenced when calculating the similarity factor" in accordance with position of the considered pixel.

In addition, the similarity factor calculating portion preferably changes the relative location in accordance with distance from the center of the image to the considered pixel.

In addition, the similarity factor calculating portion preferably divides the image into a plurality of regions and changes the relative location for each of the regions.

In addition, the similarity factor calculating portion preferably changes the relative location in accordance with a characteristic of color shift of an optical system for generating the image.

Another image processing device according to the present invention includes a similarity factor calculating portion locally comparing pixels that compose an image so as to calculate a similarity factor of the pixels in a predetermined direction, and includes a pixel value calculating portion referencing the pixels that compose the image so as to obtain a value of a new pixel. In this case, the similarity factor calculating portion calculates the similarity factor of the pixels in accordance with positions of the pixels in the image. The pixel value calculating portion changes relative location of "a considered pixel from which the new value is to be calculated" and "a reference pixel that is referenced when calculating the new value" in accordance with position of the considered pixel and the similarity factor, and calculates the new value of the considered pixel.

In addition, the pixel value calculating portion preferably changes the relative location predetermined in accordance with "distance from the center of the image to the considered pixel", according to the similarity factor.

In addition, the pixel value calculating portion preferably divides the image into a plurality of regions and changes the relative location predetermined for each of the regions in accordance with the similarity factor.

In addition, the pixel value calculating portion preferably changes the relative location predetermined in accordance with "a characteristic of color shift of an optical system for generating the image", according to the similarity factor.

In addition, when the new value contains an element composed of a value of a color that has color shift and the element is calculated, the pixel value calculating portion preferably selects, as the reference pixel, a pixel in a local region selected in accordance with a direction of the color shift and an amount of the color shift. In this case, the pixel value calculating portion preferably adds with weight the selected reference pixel in accordance with the similarity factor so as to calculate the new value.

An image processing program according to the present invention causes a computer to perform functions of a similarity factor calculating portion locally comparing pixels that compose an image so as to calculate a similarity factor of the pixels in a predetermined direction, and of an analyzing portion analyzing structure of the image in accordance with the similarity factor calculated by the similarity factor calculating portion. In this case, the similarity factor calculating portion realized on the computer calculates the similarity factor of the pixels in accordance with positions of the pixels in the image.

Another image processing program according to the present invention causes a computer to perform functions of a similarity factor calculating portion locally comparing pixels that compose an image so as to calculate a similarity factor of the pixels in a predetermined direction, and of a pixel value calculating portion referencing the pixels that compose the image so as to obtain a value of a new pixel. In this case, the similarity factor calculating portion realized on the computer calculates the similarity factor of the pixels in accordance with positions of the pixels in the image. The pixel value calculating portion changes relative location of "a considered pixel from which the new value is to be calculated" and "a reference pixel that is referenced when calculating the new value" in accordance with position of the considered pixel and the similarity factor, and calculates the new value of the considered pixel.

BRIEF DESCRIPTION OF DRAWINGS

The features and advantages of the present invention will become apparent from the following description:

FIG. 2 is a schematic diagram showing an example of an arrangement of color components of image data;

FIG. 5 is a schematic diagram showing an example of divided blocks;

FIG. 6 is a schematic diagram showing an example of color shift;

FIG. 10 is a schematic diagram showing examples of coefficient filters.

DESCRIPTION OF THE PREFERRED EMBODIMENTS

First of all, the structure of an electronic camera that is in common with each of embodiments of the present invention will be described. An image processing device according to the present invention corresponds to an image processing portion that is built in the electronic camera.

Figure 1:
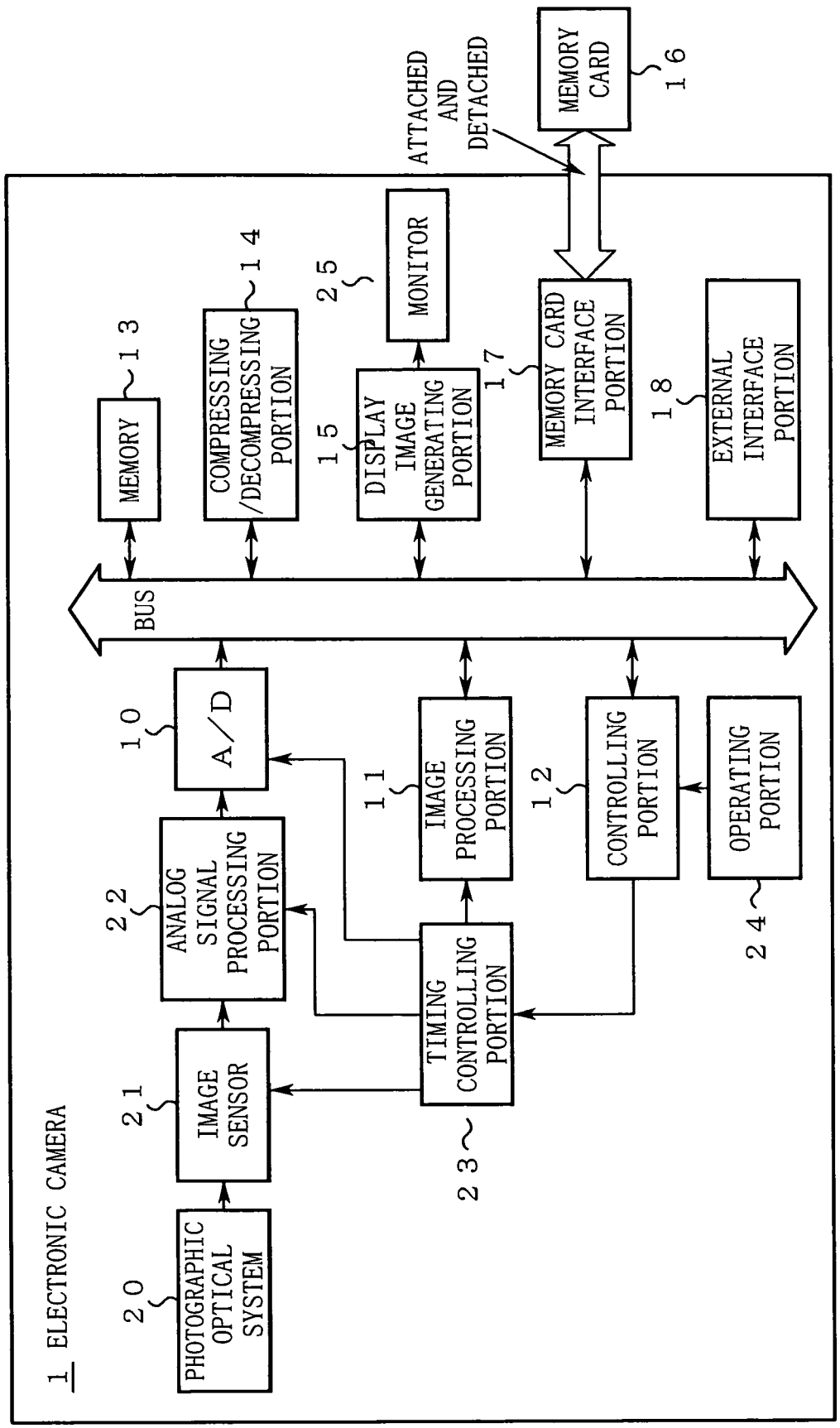
FIG. 1 is a block diagram showing an electronic camera.

FIG. 1 is a block diagram showing an electronic camera.

In FIG. 1, the electronic camera 1 includes an A/D converting portion 10, an image processing portion 11, a controlling portion 12, a memory 13, a compressing/decompressing portion 14, and a display image generating portion 15. In addition, the electronic camera 1 includes a memory card interface portion 17 and an external interface portion 18. The memory card interface portion 17 realizes an interface with a memory card (card shaped removable memory) 16. The external interface portion 18 realizes an interface with an external device (for example, a personal computer and so forth) through a predetermined cable or a wireless transmission path. These structural elements are mutually connected through a bus.

Furthermore, the electronic camera 1 includes a photographic optical system 20, an image sensor 21, an analog signal processing portion 22, and a timing controlling portion 23.

An optical image is focused on the image sensor 21 through the photographic optical system 20. An output of the image sensor 21 is connected to the analog signal processing portion 22. An output of the analog signal processing portion 22 is connected to the A/D converting portion 10. An output of the controlling portion 12 is connected to the timing controlling portion 23. An output of the timing controlling portion 23 is connected to the image sensor 21, the analog signal processing portion 22, the A/D converting portion 10, and the image processing portion 11.

In addition, the electronic camera 1 includes an operating portion 24 and a monitor 25. The operating portion 24 corresponds to a release button, a mode selection button, and so forth.

An output of the operating portion 24 is connected to the controlling portion 12. An output of the display image generating portion 15 is connected to the monitor 25.

When the operator selects a photographing mode and presses the release button of the operating portion 24 of the electronic camera 1 structured as shown in FIG. 1, the controlling portion 12 controls the image sensor 21, the analog signal processing portion 22, and the A/D converting portion 10 through the timing controlling portion 23. As a result, the image sensor 21 generates an image signal in accordance with an optical image. The analog signal processing portion 22 performs a signal process such as a black level compensation for the image signal. The A/D converting portion 10 digitizes the image signal and supplies the resultant image data to the image processing portion 11.

A color filter array (not shown) in which three color filters of R, G, and B (red, green, and blue) are arranged in Bayer-pattern is disposed on the image sensor 21. Thus, image data supplied to the image processing portion 11 is data having one of color components of R, G, and B in units of one pixel.

FIG. 2 is a schematic diagram showing an example of an arrangement of color components of such image data.

FIG. 2 shows types of color components with R, G, and B, and positions of pixels corresponding to respective color components with coordinates [X, Y]. In calculation formulas that follow, when green components of color information in individual pixels are distinguished from other color components, R and B shown in FIG. 2 are substituted with Z. Color information of pixels corresponding to red or blue components is represented by Z[i, j]. Color information of pixels corresponding to green components is represented by G[i, j].

The image processing portion 11 is realized by hardware such as an ASIC (Application Specific IC) or a pre-recorded image processing program (that corresponds to an image processing program described in Claims). The image processing portion 11 performs various image processes for image data arranged as shown in FIG. 2.

However, color shift has been taken place in image data supplied to the image processing portion 11 due to chromatic aberration of magnification of the photographic optical system 20. The image processing portion 11 performs an image process in consideration of a characteristic of the color shift.

When necessary, image data that has been subjected to the image process by the image processing portion 11 is compressed in a predetermined manner by the compressing/decompressing portion 14. The compressed image data is recorded in the memory card 16 through the memory card interface portion 17.

Alternatively, the image data having been subjected to the image process by the image processing portion 11 may be directly recorded in the memory card 16 or supplied to an external device through the external interface portion 18 without being compressed.

When the operator selects a displaying mode with the operating portion 24, image data recorded in the memory card 16 is read therefrom through the memory card interface portion 17 and decompressed by the compressing/decompressing portion 14. The decompressed image data is displayed on the monitor 25 through the display image generating portion 15. Alternatively, the decompressed image data may not be displayed on the monitor 25, but supplied to an external device through the external interface portion 18.

Next, image processes of the image processing portion 11 that is one of the features of the present invention will be described according to each embodiment thereof. In first and second embodiments, a process for calculating a similarity factor of each pixel in a predetermined direction (hereinafter referred to as "similarity factor calculating process") will be described among the image analyzing processes performed by the image processing portion 11. In a third embodiment, an image process for correlating a Y component to all the pixels (hereinafter referred to as "Y component generating process") will be described among color coordinates transformation process for generating an image data of YCbCr color coordinates from an image data arranged as shown in FIG. 2.

Description of First Embodiment

Next, the similarity factor calculating process according to the first embodiment will be described.

First of all, the image processing portion 11 calculates similarity factor components of plural types in a plurality of predetermined directions, for each of considered pixels to be calculated. The plural types of similarity factor components contain similarity factor components that compose a similarity factor element in same colors (that are absolute values of difference between color information of same colors and that correspond to a similarity factor component of RR, a similarity factor component of GG, and a similarity factor component of BB that will be described later), similarity factor components that compose a similarity factor element in different colors (that are absolute values of difference between color information of different colors and that correspond to a similarity factor component of RG and a similarity factor component of GB that will be described later), and so forth.

When a pixel that is placed at coordinates [i, j] and that corresponds to a red component is a considered pixel, a plurality of similarity factor components in the vertical direction can be calculated with reference to color information and luminance (values calculated by later described Formula 7) of pixels arranged in the vertical direction, by Formulas 1 to 6 that follow. Each similarity factor component calculated here represents higher similarity, as the value gets smaller.

Similarity factor component of RR in vertical direction:

$$Cvr[i, j]=(|Z[i, j-2]-Z[i, j]|+|Z[i, j+2]-Z[i, j]|)/2 \quad \text{Formula 1}$$

Similarity factor component of GG in vertical direction:

$$Cvg[i, j]=|G[i, j-1]-G[i, j+1]| \quad \text{Formula 2}$$

Similarity factor component of BB in vertical direction:

$$Cvb[i, j]=(|Z[i-1, j-1]-Z[i-1, j+1]|+|Z[i+1, j-1]-Z[i+1, j+1]|)/2 \quad \text{Formula 3}$$

Similarity factor components of RG in vertical direction:

$$Cvrg[i, j]=(|G[i, j-1]-Z[i, j]|+|G[i, j+1]-Z[i, j]|)/2 \quad \text{Formula 4}$$

Similarity factor component of GB in vertical direction:

$$Cvgb[i, j]=(|Z[i-1, j-1]-G[i-1, j]|+|Z[i-1, j+1]-G[i-1, j]|+|Z[i+1, j-1]-G[i+1, j]|+|Z[i+1, j+1]-G[i+1, j]|)/4 \quad \text{Formula 5}$$

Similarity factor component in luminance in vertical direction:

$$Cvy[i, j]=(|Y[i, j-1]-Y[i, j]|+|Y[i, j+1]-Y[i, j]|)/2 \quad \text{Formula 6}$$

In Formula 6, Y[i, j] is a value calculated by Formula 7. Y[i, j] corresponds to luminance that is generated by a filtering process for averaging color information of pixels arranged around a target pixel from which a similarity factor component is calculated in the ratio of R:G:B=1:2:1. Note that in Formula 7, A represents any color information that is the value of G or Z depending on the position.

$$Y[i, j]=(4 \cdot A[i, j]+2 \cdot (A[i, j-1]+A[i, j+1]+A[i-1, j]+A[i+1, j])+A[i-1, j-1]+A[i-1, j+1]+A[i+1, j-1]+A[i+1, j+1])/16 \quad \text{Formula 7}$$

In the forgoing example, a plurality of similarity factor components in the vertical direction of a pixel corresponding to a red component was calculated. A plural types of similarity factor components in another direction and similarity factor components of pixels corresponding to other color components can also be calculated in the same manner.

In the forgoing example, similarity factors in the vertical direction were calculated. Likewise, similarity factors in the horizontal direction can be calculated.

Next, the image processing portion 11 adds with weight a plurality of types of similarity factor components in each direction for each considered pixel with weighting coefficients that allow the ratio of the similarity factor elements in same colors to the similarity factor elements in different colors to be varied in accordance with the distance from the center of the image to a considered pixel so as to obtain the similarity factor of the considered pixel.

For example, the image processing portion 11 adds with weight a plurality of similarity factor components in the vertical direction calculated in the above manner in accordance with the following Formula 8, and calculates similarity factors in the vertical direction.

$$Cv[i, j] = k1(a1 \cdot Cvr[i, j] + a2 \cdot Cvg[i, j] + a3 \cdot Cvb[i, j]) + k2(b1 \cdot Cvrg[i, j] + b2 \cdot Cvgb[i, j]) + c \cdot Cvy[i, j] \quad \text{Formula 8}$$

where k1, a1, a2, a3, k2, b1, b2, and c in Formula 8 are predetermined values that satisfy the following Condition 1.

$$k1(a1+a2+a3)+k2(b1+b2)+c=1 \quad \text{Condition 1}$$

where the ratio of k1 to K2 is predetermined so that the value of k2 is reduced as the distance from the center of the image to the considered pixel becomes longer.

Threshold values r0 and r1 are predetermined in accordance with the relation of a distance Rt from the center of the image to a considered pixel, color shift due to information that represents a characteristic of chromatic aberration of magnification of the photographic optical system 20 (for example, a lens type, a focal distance, an aperture value, and so forth), and a pixel pitch. With the threshold values r0 and r1, the ratio of k1 to k2 can be obtained as follows.

when $Rt \leq r0$, k1:k2=2:2,
when $r0 < Rt \leq r1$, k1:k2=2:1, and
when $r1 < Rt$, k1:k2=2:0.

Figure 4:
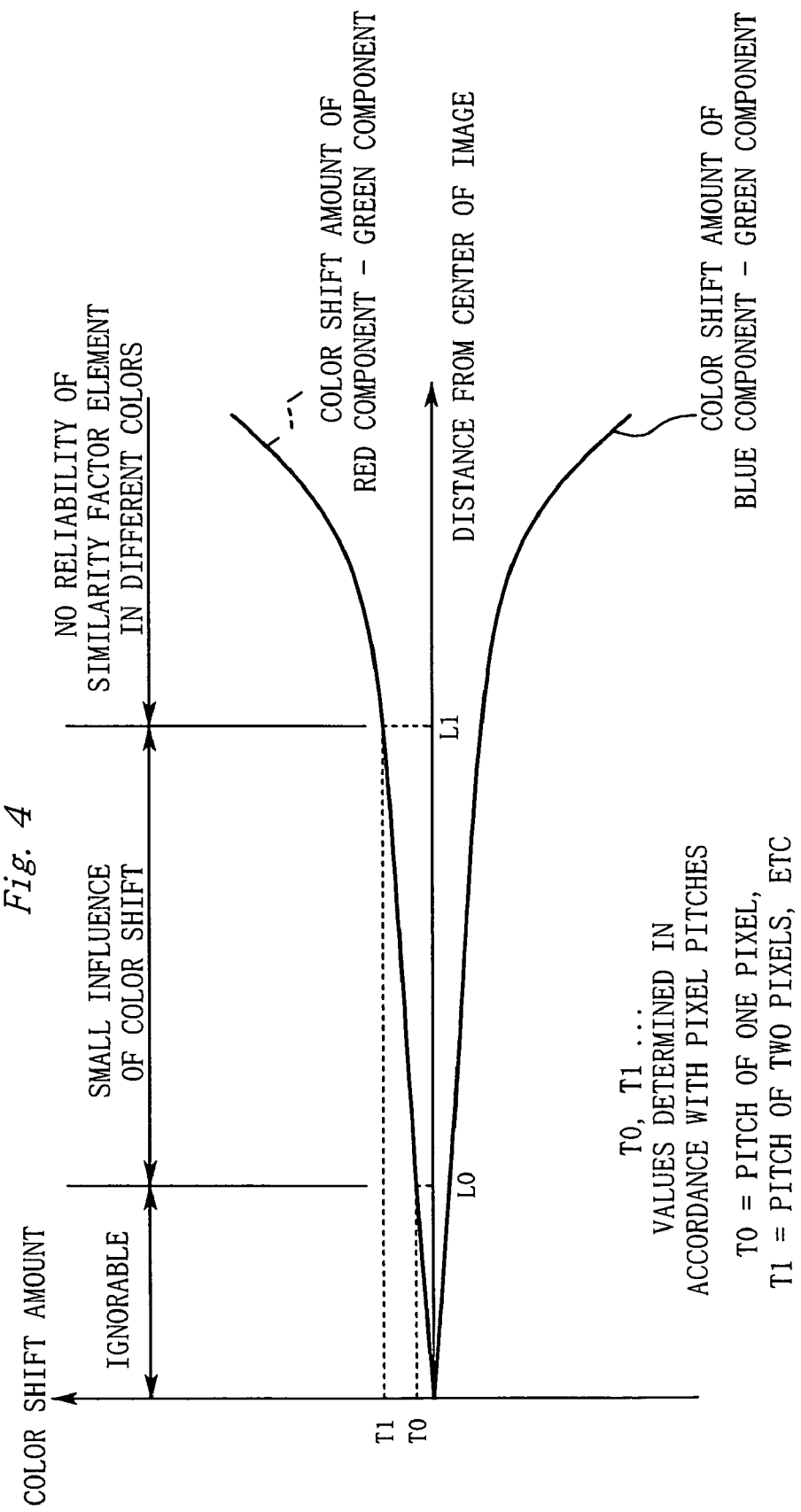
FIG. 4 is a schematic diagram showing a characteristic of a color shift amount.

When the color shift amount due to the chromatic aberration of magnification of the photographic optical system 20 represents the characteristic as shown in FIG. 4, the relations of the threshold values may be r0=L0 and r1=L1.

As described above, according to Formula 8, a similarity factor in the vertical direction is calculated by adding with weight a similarity factor element in same colors, a similarity factor element in different colors, and a similarity factor component in luminance in the vertical direction. The similarity factor element in same colors is calculated by adding with weight a similarity factor component of RR, a similarity factor component of GG, and a similarity factor component of BB in the vertical direction. The similarity factor element in different colors is calculated by adding with weight a similarity factor component of RG and a similarity factor component of GB in the vertical direction.

Figure 3:
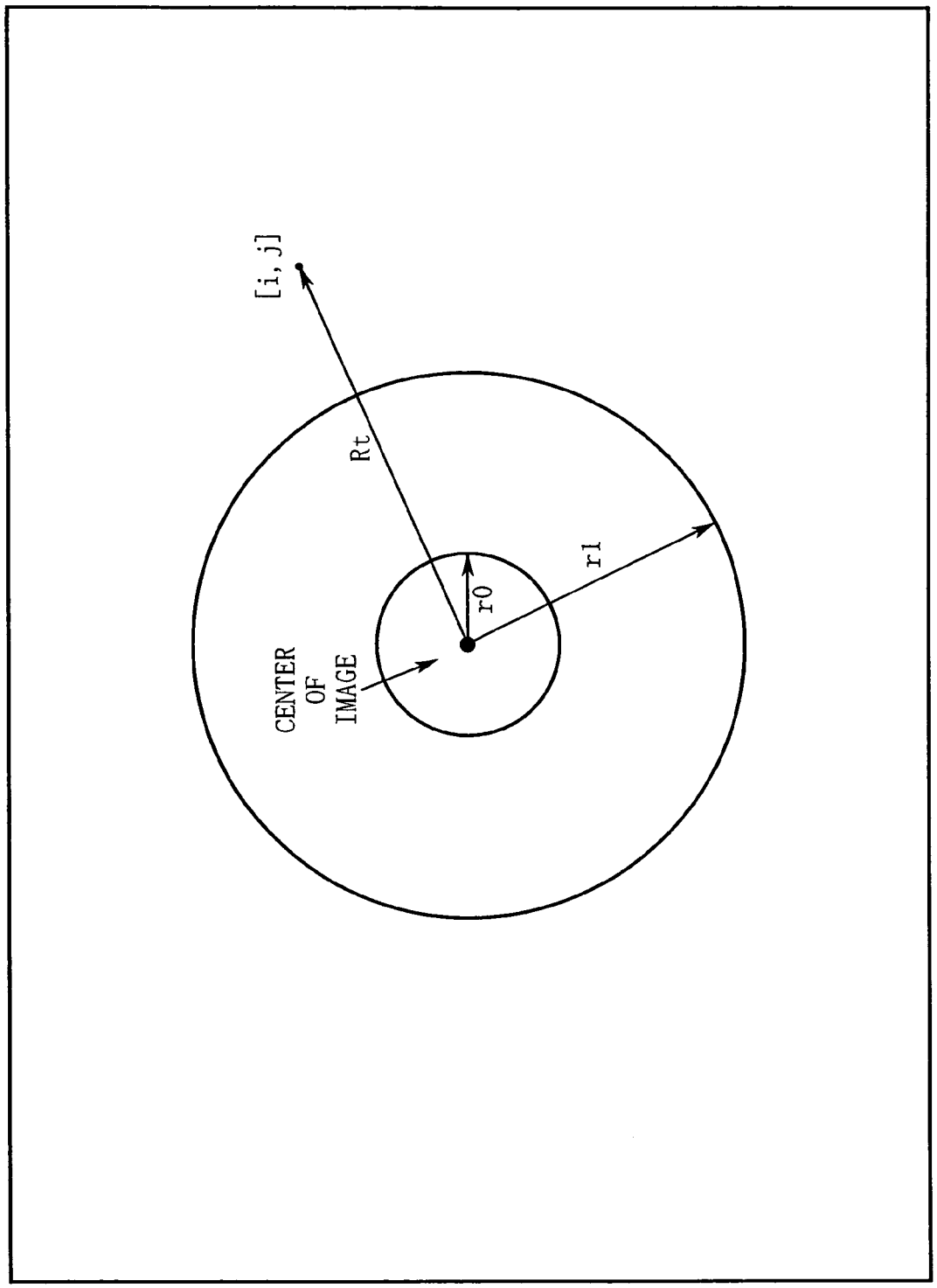
FIG. 3 is a schematic diagram showing the relation of a distance Rt and threshold values r0 and r1.

In addition, according to Formula 8, the ratio of the similarity factor element in same colors to the similarity factor element in different colors is determined in accordance with the ratio of k1 to k2. Thus, the similarity factor in the vertical direction is calculated so that the weight of the similarity factor element in different colors is smaller at the peripheral part of the image than at the center part of the image. In particular, when a pixel whose similarity factor is to be calculated is placed at a position shown in FIG. 3 (at coordinates [i, j]) (r1<Rt), the similarity factor in the vertical direction of the pixel does not contain a similarity factor element in different colors, but contains a similarity factor element in same colors.

In other words, according to the first embodiment, when the color shift amount due to the chromatic aberration of magnification of the photographic optical system 20 increases as the distance from the center of the image gets longer as shown in FIG. 4, the weight to the similarity factor element in different colors that is affected by the color shift can be decreased as the color shift amount is increased.

Thus, according to the first embodiment, the similarity factor can be accurately calculated with suppressing the influence of the color shift that varies depending on the position of a considered pixel.

Description of Second Embodiment

Next, a similarity factor calculating process according to the second embodiment will be described.

Like the first embodiment, first of all, the image processing portion 11 calculates plural types of similarity factor components for each considered pixel in a plurality of predetermined directions.

Thereafter, the image processing portion 11 adds with weight plural types of similarity factor components for each considered pixel in each of the directions, and calculates the similarity factor. However, the image processing portion 11 divides image data supplied through the A/D converting portion 10 and so forth into a predetermined number of blocks. When the image processing portion 11 calculates similarity factors of pixels in the same block, it uses a weighting coefficient that causes the ratio of a similarity factor element in same colors to a similarity factor element in different colors to be the same. The image processing portion 11 changes the weighting coefficient in accordance with the distance from the center of the image to each block.

For example, when image data is divided into 5×7 blocks as shown in FIG. 5, and a plurality of similarity factor components in the vertical direction calculated in accordance with Formula 1 to Formula 6 according to the first embodiment are added with weight in accordance with Formula 8, the ratio of K1 to K2 that represents the ratio of a similarity factor element in same colors to a similarity factor element in different colors may have the following values.

In block 1: "k1:k2=2:2".
In block 2 to block 9: "k1:k2=2:1".
In block 10 to block 35: "k1:k2=2:0".

In other words, the ratio of k1 to k2 is determined so that the value of k2 of a block is smaller at the peripheral part of the image than at the center part of the image.

Thus, a similarity factor in the vertical direction is calculated so that the weight of a similarity factor element in different colors is smaller at the peripheral part of the image than at the center part of the image. In particular, a similarity factor of pixels in the vertical direction of the block 10 to block 35 does not contain a similarity factor element in different colors, but contain a similarity factor element in same colors.

As described above, according to the second embodiment, the weight of a similarity factor element in different colors that is affected by color shift can be decreased as the color shift is increased, likewise in the first embodiment. As a result, a similarity factor can be accurately calculated with suppressing influence of color shift that varies depending on the position of a considered pixel.

In addition, according to the second embodiment, it is not necessary to calculate the distance from the center of the image to a considered pixel, unlike the first embodiment. Thus, a similarity factor can be accurately and quickly calculated.

Description of Third Embodiment

Next, a Y component generating process according to the third embodiment will be described.

First of all, the image processing portion 11 calculates a color shift amount (a color shift amount of a red component to a green component and a color shift amount of a blue component to a green component) for each considered pixel from which a Y component is to be generated, based on information (for example, a lens type, a focal distance, an aperture value, and so forth) that represents a characteristic of chromatic aberration of magnification of the photographic optical system 20, and based on the distance from the center of the image to the considered pixel and the direction. However, it is assumed that the color shift amount here is calculated in consideration of the direction of the color shift.

The image processing portion 11 may pre-record a look up table (LUT) that correlates the distance from the center of an image to a considered pixel, direction, and color shift amount in accordance with information representing a characteristic of chromatic aberration of magnification of the photographic optical system 20, to determine the color shift amount with reference to the LUT.

Thereafter, the image processing portion 11 calculates color information of a green component of a considered pixel with reference to color information of green components in a local region (for example, 4×4 pixels) containing the considered pixel.

For example, when a pixel corresponding to a red component (or a blue component) is a considered pixel, color information of a green component of the considered pixel can be calculated by averaging color information of green components placed at the immediately upper, lower, left, and right positions of the considered pixel. When a pixel corresponding to a green component is a considered pixel, color information of the green component of the considered pixel can be used as it is.

Thereafter, the image processing portion 11 detects the position where the red component is shifted from the considered pixel in accordance with the color shift amount of the red component to the green component, and calculates color information of the red component of the considered pixel by performing linear interpolation with reference to color information of red components arranged in the local region (for example, 4×4 pixels) that contains the shifted position. Likewise, the image processing portion 11 calculates color information of a blue component of the considered pixel.

When a pixel that corresponds to a red component and is placed at coordinates [i, j] is a considered pixel, and a red component to be focused on the coordinates [i, j] is shifted to a position represented by a black circle shown in FIG. 6 (at an intermediate position of coordinates [i+2, j−3] and coordinates [i+3, j−3]), color information of the red component of the considered pixel can be calculated with color information (equivalent to R[i+2, j−4], R[i+4, j−4], R[i+2, j−2], R[i+4, j−2]) of red components in a local region 1 shown in FIG. 6. On the other hand, when a blue component to be focused on coordinates [i, j] is shifted to a position represented by a white circle shown in FIG. 6 (at an intermediate position of coordinates [i−3, j+3] and coordinates [i−2, j+3]), color information of a green component of the considered pixel can be calculated with color information (equivalent to B[i−3, j+3], B[i−1, j+3] of blue components in a local region 2 shown in FIG. 6.

In other words, a local region that contains color information referenced when calculating color information of a red component or a blue component is moved from a local region that contains a considered pixel. The moved amount of a local region is varied in accordance with the color shift amount corresponding to the position of a considered pixel.

Thereafter, the image processing portion 11 adds with weight the color information of each color component of the considered pixel with a predetermined weighting coefficient, thereby generating a Y component.

As described above, according to the third embodiment, since color information of a color component that has color shift can be calculated with reference to color information placed in a local region moved in accordance with a color shift amount, a Y component can be accurately generated without performing a filtering process for correcting color shift.

Alternatively, such a Y component generating process as described above can be accomplished by a filtering process using a coefficient filter.

Figure 7:
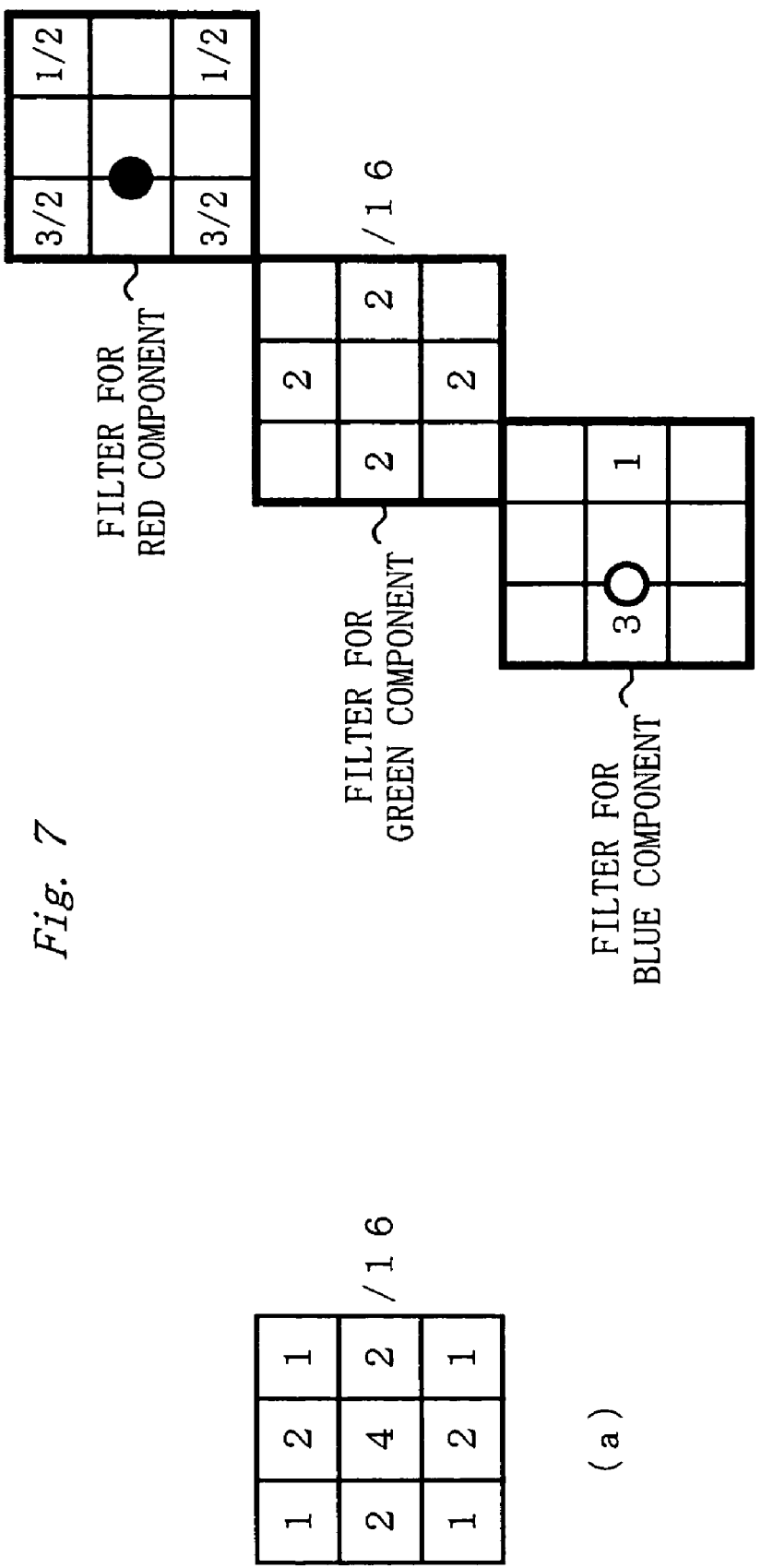
FIG. 7 is a schematic diagram showing examples of coefficient filters.

For example, for a considered pixel in which color shift takes place as shown in FIG. 6, a filtering process using a coefficient filter shown in FIG. 7(*b*) may be performed instead of a conventional coefficient filter shown in FIG. 7(*a*). The coefficient filter shown in FIG. 7(*b*) is structured in such a manner that a center position of a green component filter is not moved whereas center positions of a red component filter and a blue component filter are moved in accordance with a color shift amount.

In addition, color shift amounts of adjacent pixels hardly change. When image data is divided into a plurality of blocks (as shown in FIG. 5), color shift amounts of pixels in the same block are almost the same.

Thus, when the image processing portion 11 pre-records a color shift amount of a representative pixel in each block and references the pre-recorded color shift amount, it is not necessary for the image processing portion 11 to calculate a color shift amount for each considered pixel. When the calculation for obtaining a color shift amount for each considered pixel is omitted, a calculation for obtaining the distance from the center of the image to a considered pixel can be omitted. Thus, a Y component can be quickly and accurately generated.

By pre-recording a value of a coefficient filter for a representative pixel in each block, a Y component can be accurately and quickly generated when a Y component generating process is performed by a filtering-process using a coefficient filter.

Figure 8:
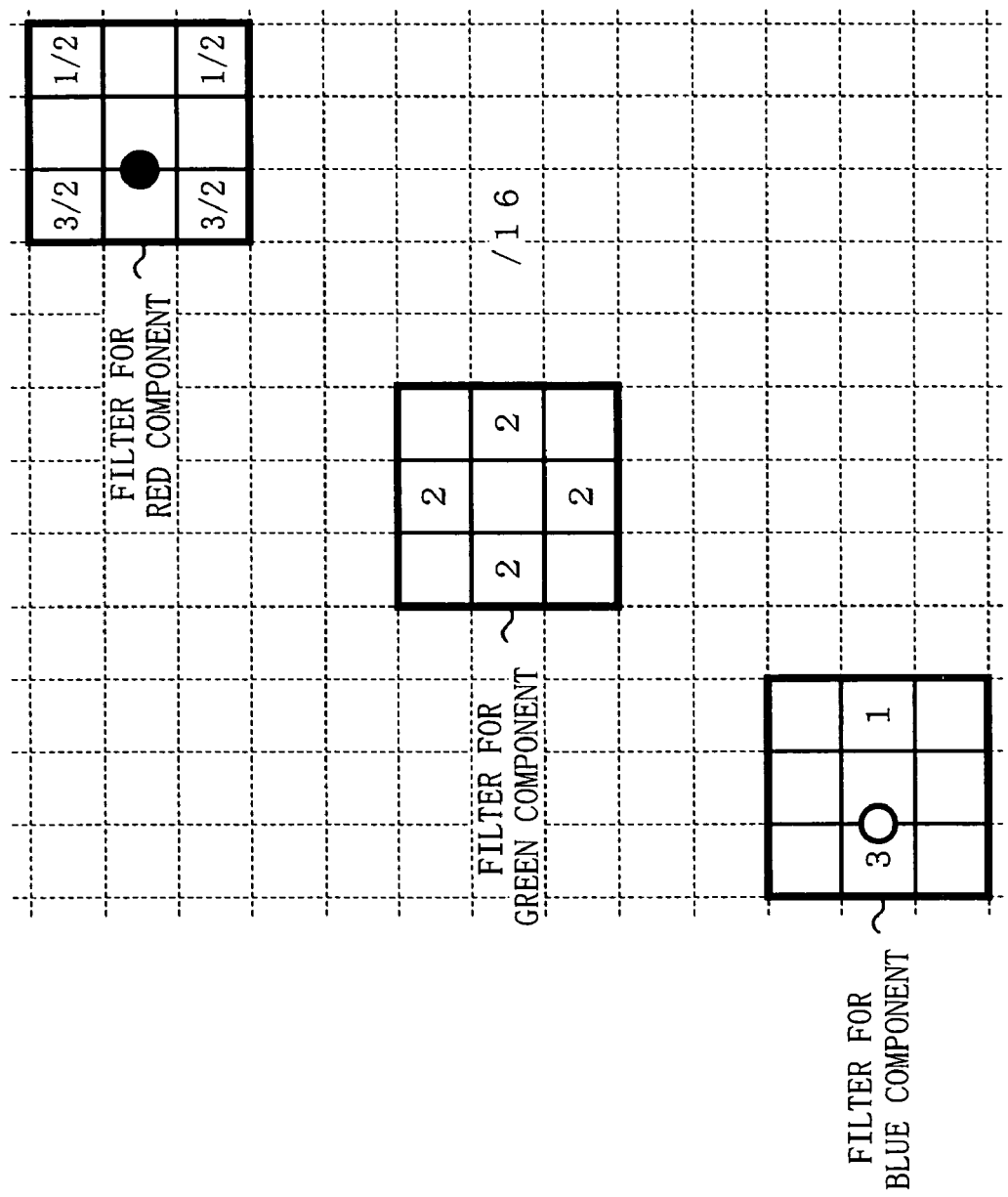
FIG. 8 is a schematic diagram showing examples of coefficient filters.

When image data is divided into 5×7 blocks as shown in FIG. 5, it is recommended that: a filtering process for block 1 is performed with a coefficient filter shown in FIG. 7(*a*); a filtering process for block 4 is performed with a coefficient filter shown in FIG. 7(*b*); and a filtering process for block is performed with a coefficient filter shown in FIG. 8.

Alternatively, it is not necessary to pre-record values of coefficient filters of all blocks. For example, only values of coefficient filters of blocks at immediately upper, lower, left, and right positions that are adjacent to a block containing the center of an image may be pre-recorded. Values of coefficient filters of another blocks may be generated by combining four pre-recorded values of coefficient filters and correcting the resultant combined value in accordance with the distance from the center of the image to each block.

According to the third embodiment, the Y component generating process that does not need to perform the image analyzing process was described. Alternatively, similarity of a considered pixel in a predetermined direction may be determined. In accordance with the determined result, the color information in each local region as described above may be selectively added with weight so as to calculate color information of each color component.

Figure 9:
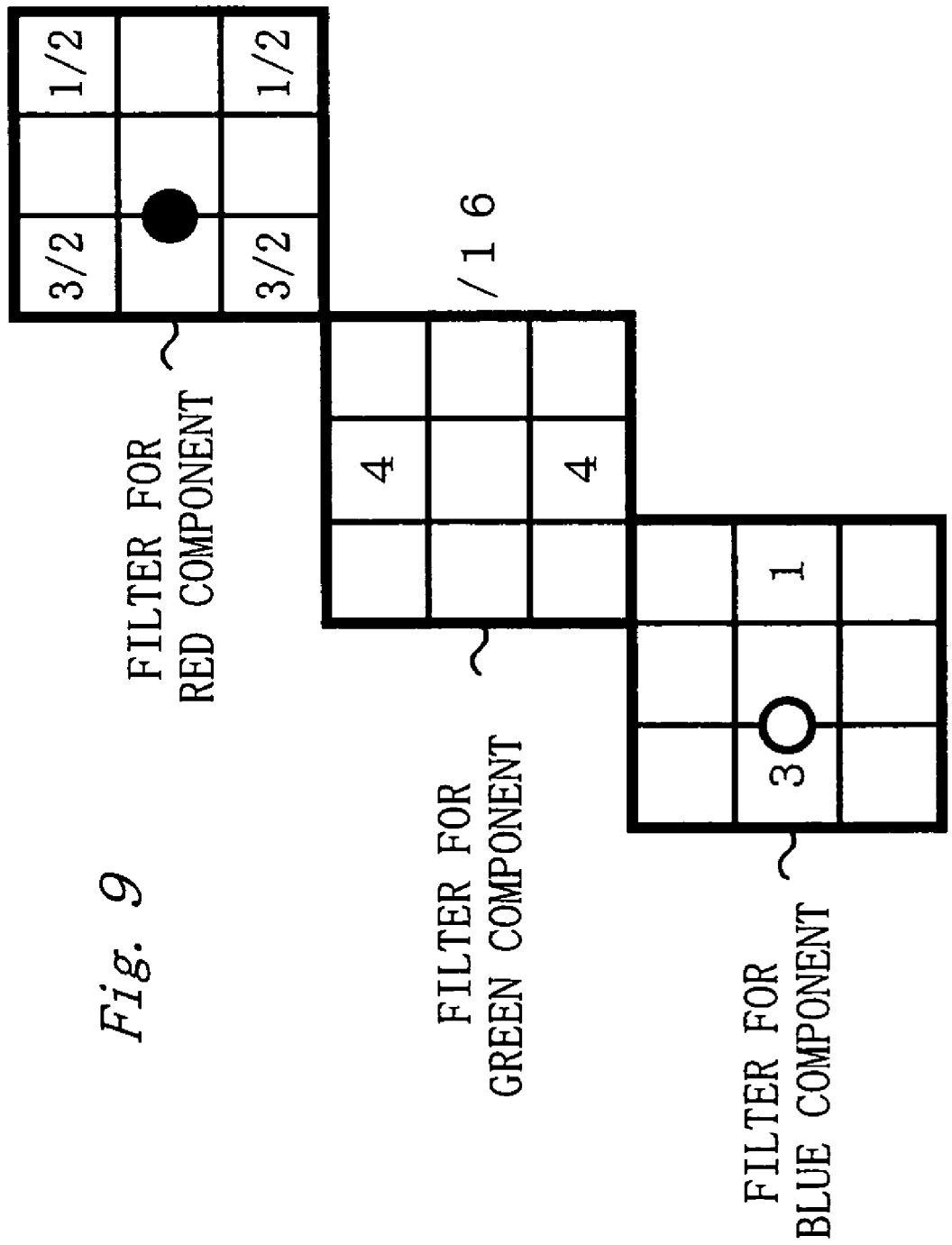
FIG. 9 is a schematic diagram showing examples of coefficient filters.

When a pixel corresponding to a red component (or a blue component) is a considered pixel and it has been determined that the similarity of the considered pixel is strong in the vertical direction, color information of a green component of the considered pixel can be calculated by averaging color information of green components placed at the immediately upper and lower positions of the considered pixel. Such a process can be accomplished by performing a filtering process using coefficient filters as shown in FIG. 9 instead of the coefficient filters shown in FIG. 7(b).

According to the third embodiment, color shift is suppressed by changing the relative locations of a considered pixel and pixels from which color information is referenced when generating a Y component, in accordance with the position of the considered pixel in the image. Such suppression of color shift can be performed in a Y component generating process for image data (in which each pixel has color information of three colors R, G, and B in RGB color system) generated through a multi-CCD type image sensor.

Likewise, a technology for changing the relative locations of a considered pixel and pixels from which color information is referenced when performing an image process can be applied to an interpolating process for generating color information of a green component for a pixel that lacks color information of a green component. The technology can also be applied to a similarity factor calculating process. As a result, color shift can be suppressed.

In particular, like the foregoing Y component generating process, an interpolating process can be accomplished by moving the center position of a particular color component filter of conventional coefficient filters in accordance with a color shift amount of the position of the considered pixel in the image, and performing a filtering process with the obtained coefficient filters.

When it has been determined that similarity in the vertical direction is strong and color shift of a red component to a green component takes place in a pixel corresponding to a red component, as shown in FIG. 6, a green component of the pixel can be generated by a filtering process using coefficient filters shown in FIG. 10(b) instead of a conventional coefficient filter shown in FIG. 10(a).

In the foregoing example, an interpolating process in the vertical direction was described. According to the present invention, however, an interpolating process in the horizontal direction can also be performed in the same manner.

In the foregoing first to third embodiments, an image process accomplished by the image processing portion 11 of the electronic camera 1 was described. The image process can be accomplished by an image processing device composed of for example a personal computer. In other words, in the electronic camera 1, image data may be recorded in the memory card 16 without being through the image processing portion 11, and the recorded image data may be read from the memory card 16 to subject to an image process, in the same manner as the image processing portion 11, by the image processing device composed of a personal computer and the like.

However, when information that represents a characteristic of a photographic optical system that generates an image cannot be obtained in the image processing device, the ratio of k1 to k2 of Formula 8 according to the first and second embodiments and the color shift amount according to the third embodiment can be designated in accordance with a characteristic of conventional chromatic aberration of magnification.

In the foregoing embodiments, the present invention is applied to an electronic camera. However, the present invention is not limited to the electronic camera. For example, the image processing device according to the present invention may be disposed in a scanner device such as a film scanner.

Moreover, when an operation of the foregoing image processing portion is coded, an image processing program that causes a computer to execute an image process can be obtained.

Although the present invention has been shown and described with respect to a best mode embodiment thereof, it should be understood by those skilled in the art that the foregoing and various other changes, omissions, and additions in the form and detail thereof may be made therein without departing from the spirit and scope of the present invention.

Industrial Utilization

As described above, according to the image processing device of the present invention, an image process can be performed with suppressing the influence of color shift due to chromatic aberration of magnification of a photographic optical system.

What is claimed is:

1. An image processing device, comprising:
   a similarity factor calculating portion locally comparing pixels that compose an image so as to calculate a similarity factor of the pixels in a predetermined direction;
   an analyzing portion analyzing structure of the image in accordance with the similarity factor calculated by the similarity factor calculating portion, wherein
   the similarity factor calculating portion calculates the similarity factor of the pixels in accordance with positions of the pixels in the image;
   the similarity factor includes a value determined by performing a weighted addition of "a similarity factor element in same colors obtained by comparing pixels of same colors" and "a similarity factor element in different colors obtained by comparing pixels of different colors"; and
   the similarity factor calculating portion changes a weighting coefficient for the weighted addition in accordance with the positions of the pixels whose similarity factor is to be calculated, and calculates the similarity factor thereof.

2. The image processing device as set forth in claim 1, wherein
   the similarity factor calculating portion changes the weighting coefficient in accordance with distance from "the center of the image" to "the pixels whose similarity factor is to be calculated".

3. The image processing device as set forth in claim 2, wherein
   the similarity factor calculating portion changes the weighting coefficient so that weight of the similarity factor element in different colors is smaller at a peripheral part of the image than at the center part of the image.

4. The image processing device as set forth in claim 2, wherein the similarity factor calculating portion divides the image into a plurality of regions and changes the weighting coefficient for each of the divided regions.

5. The image processing device as set forth in claim 1, wherein the similarity factor calculating portion changes the weighting coefficient in accordance with a characteristic of color shift of an optical system for generating the image.

6. An image processing device, comprising:
a similarity factor calculating portion locally comparing pixels that compose an image so as to calculate a similarity factor of the pixels in a predetermined direction;
an analyzing portion analyzing structure of the image in accordance with the similarity factor calculated by the similarity factor calculating portion, wherein
the similarity factor calculating portion calculates the similarity factor of the pixels in accordance with positions of the pixels in the image;
the similarity factor calculating portion calculates a similarity factor including a weighted addition value of "a similarity factor element in same colors obtained by comparing pixels of same colors" and "a similarity factor element in different colors obtained by comparing pixels of different colors" in a region containing the center of the image; and
the similarity factor calculating portion calculates a similarity factor that does not contain the similarity factor element in different colors, but contains the similarity factor element in same colors in a region other than that containing the center of the image.

7. An image Processing device, comprising:
a similarity factor calculating portion locally comparing pixels that compose an image so as to calculate a similarity factor of the pixels in a predetermined direction;
an analyzing portion analyzing structure of the image in accordance with the similarity factor calculated by the similarity factor calculating portion, wherein
the similarity factor calculating portion calculates the similarity factor of the pixels in accordance with positions of the pixels in the image; and
the similarity factor calculating portion changes relative location of "a considered pixel whose similarity factor is to be calculated" and "a reference pixel that is referenced when calculating the similarity factor" in accordance with position of the considered pixel.

8. The image processing device as set forth in claim 7, wherein
the similarity factor calculating portion changes the relative location in accordance with distance from the center of the image to the considered pixel.

9. The image processing device as set forth in claim 8, wherein
the similarity factor calculating portion divides the image into a plurality of regions and changes the relative location for each of the regions.

10. The image processing device as set forth in claim 7, wherein
the similarity factor calculating portion changes the relative location in accordance with a characteristic of color shift of an optical system for generating the image.

11. An image processing device, comprising:
a similarity factor calculating portion locally comparing pixels that compose an image so as to calculate a similarity factor of the pixels in a predetermined direction; and a pixel value calculating portion referencing the pixels that compose the image so as to obtain a value of a new pixel, wherein
the similarity factor calculating portion calculates the similarity factor of the pixels in accordance with positions of the pixels in the image, and
the pixel value calculating portion changes relative location of "a considered pixel from which the new value is to be calculated" and "a reference pixel that is referenced when calculating the new value" in accordance with position of the considered pixel and the similarity factor, and calculates the new value of the considered pixel.

12. The image processing device as set forth in claim 11, wherein
the pixel value calculating portion changes the relative location predetermined in accordance with "distance from the center of the image to the considered pixel", according to the similarity factor.

13. The image processing device as set forth in claim 12, wherein
the pixel value calculating portion divides the image into a plurality of regions and changes the relative location predetermined for each of the regions in accordance with the similarity factor.

14. The image processing device as set forth in claim 11, wherein
the pixel value calculating portion changes the relative location predetermined in accordance with "a characteristic of color shift of an optical system for generating the image", according to the similarity factor.

15. The image processing device as set forth in claim 14, wherein:
when the new value contains an element composed of a value of a color that has color shift and the element is calculated, the pixel value calculating portion selects, as the reference pixel, a pixel in a local region selected in accordance with a direction of the color shift and an amount of the color shift; and
the pixel value calculating portion adds with weight the selected reference pixel in accordance with the similarity factor so as to calculate the new value.

16. A computer readable medium storing an image processing program, causing a computer to perform the functions of:
locally comparing pixels that compose an image with a similarity factor calculating portion so as to calculate a similarity factor of the pixels in a predetermined direction; and
referencing the pixels that compose the image with a pixel value calculating portion so as to obtain a value of a new pixel, wherein
the similarity factor calculating portion calculates the similarity factor of the pixels in accordance with positions of the pixels in the image, and
the pixel value calculating portion changes relative location of "a considered pixel from which the new value is to be calculated" and "a reference pixel that is referenced when calculating the new value" in accordance with position of the considered pixel and the similarity factor, and calculates the new value of the considered pixel.

* * * * *